United States Patent
Hamalainen

(10) Patent No.: US 8,996,854 B2
(45) Date of Patent: Mar. 31, 2015

(54) METHOD FOR SECURE DOWNLOADING OF APPLICATIONS

(75) Inventor: Antti Hamalainen, Helsinki (FI)

(73) Assignee: Giesecke & Devrient GmbH, Munich (DE)

( * ) Notice: Subject to any disclaimer, the term of this patent is extended or adjusted under 35 U.S.C. 154(b) by 1853 days.

(21) Appl. No.: 10/546,641

(22) PCT Filed: Feb. 16, 2004

(86) PCT No.: PCT/SE2004/000201
§ 371 (c)(1),
(2), (4) Date: May 23, 2006

(87) PCT Pub. No.: WO2004/082310
PCT Pub. Date: Sep. 23, 2004

(65) Prior Publication Data
US 2006/0236092 A1    Oct. 19, 2006

(30) Foreign Application Priority Data

Oct. 3, 2003 (SE) ....................................... 0300670

(51) Int. Cl.
*H04L 29/06* (2006.01)
*H04M 1/725* (2006.01)
*H04W 12/10* (2009.01)
*H04L 29/08* (2006.01)

(52) U.S. Cl.
CPC ................ *H04L 63/12* (2013.01); *H04L 67/10* (2013.01); *H04L 63/126* (2013.01); *H04M 1/72525* (2013.01); *H04W 12/10* (2013.01); *H04L 67/06* (2013.01)

USPC ................... 713/151; 713/187; 726/2; 726/3; 726/22

(58) Field of Classification Search
CPC ....... H04L 63/12; H04L 63/126; H04L 67/06; H04L 67/10; H04W 12/10; H04M 1/72525
USPC .............................. 713/151, 187; 726/3, 2, 22
See application file for complete search history.

(56) References Cited

U.S. PATENT DOCUMENTS

| | | | |
|---|---|---|---|
| 6,275,695 B1 * | 8/2001 | Obhan | 455/423 |
| 6,463,535 B1 * | 10/2002 | Drews | 713/176 |
| 6,931,546 B1 * | 8/2005 | Kouznetsov et al. | 726/23 |
| 6,988,209 B1 * | 1/2006 | Balasubramaniam et al. | 726/22 |
| 7,502,941 B2 * | 3/2009 | Michael et al. | 713/189 |
| 7,934,197 B2 * | 4/2011 | Thorell | 717/120 |
| 8,588,415 B2 * | 11/2013 | Pailles et al. | 380/247 |
| 2001/0049274 A1 * | 12/2001 | Degraeve | 455/412 |

(Continued)

FOREIGN PATENT DOCUMENTS

WO    WO 0167785 A2 *    9/2001    ............... H04Q 7/00

*Primary Examiner* — Sarah Su
(74) *Attorney, Agent, or Firm* — Fasth Law Offices; Rolf Fasth

(57) ABSTRACT

The method is for downloading applications takes place in a network that has a server, a mobile terminal, a trusted operator and preferably, a personal computer. In the method a user selects an application to be downloaded at his computer or mobile terminal. The user then sends a request to the server for downloading the selected application to the mobile terminal. The server sends a message to the mobile terminal with instructions for downloading of the application. This message is sent via a trusted operator in order to ensure a secure downloading. Thereafter, the application is downloaded to the mobile terminal.

11 Claims, 2 Drawing Sheets

(56) References Cited

U.S. PATENT DOCUMENTS

Figure 1:
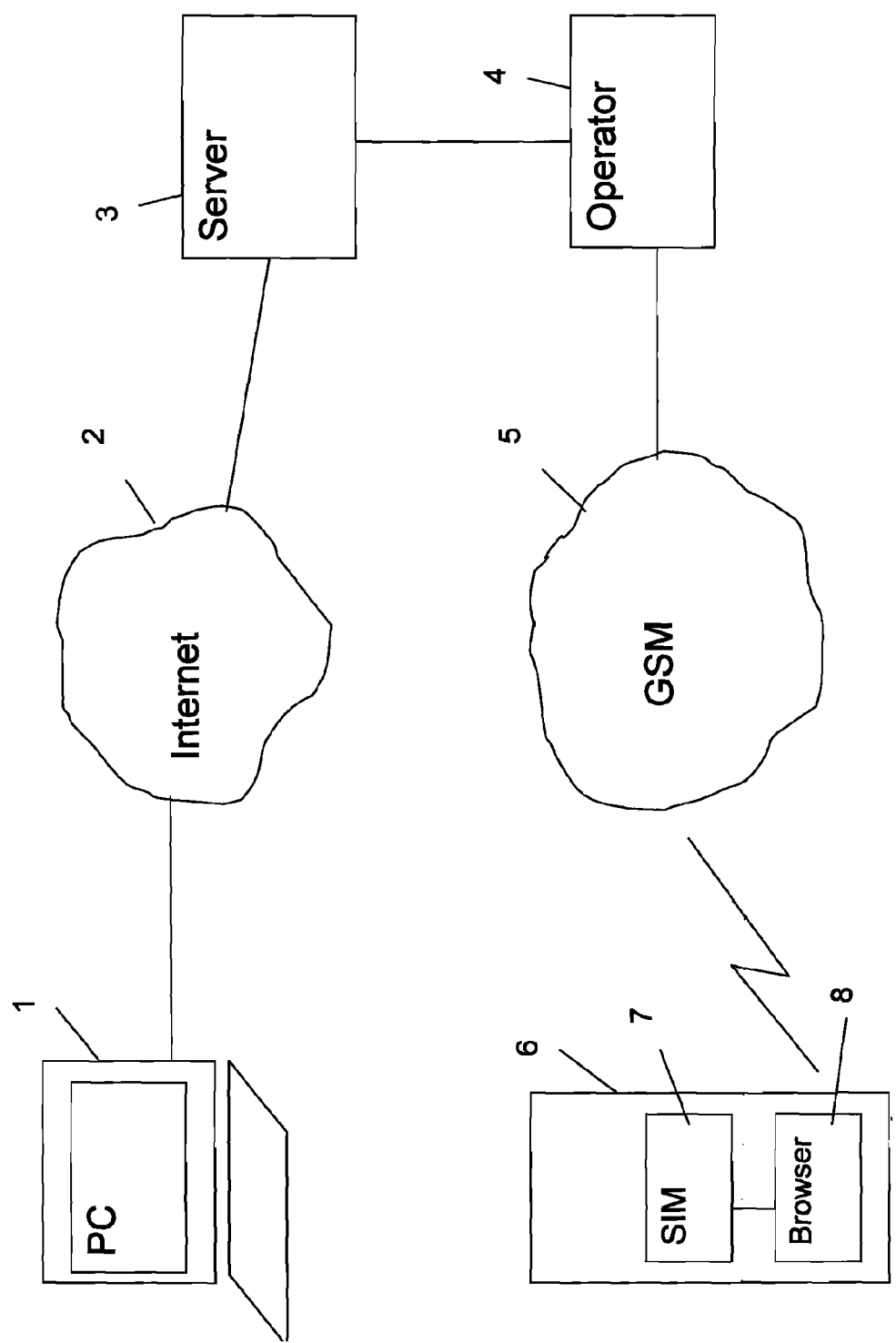

| | | |
|---|---|---|
| 2002/0160805 A1* | 10/2002 | Laitinen et al. ............... 455/550 |
| 2003/0014315 A1* | 1/2003 | Jaalinoja et al. ................ 705/18 |
| 2003/0148775 A1* | 8/2003 | Spriestersbach et al. ..... 455/456 |
| 2003/0200184 A1* | 10/2003 | Dominguez et al. ............ 705/78 |
| 2003/0237028 A1* | 12/2003 | Mantyla .......................... 714/38 |
| 2004/0002943 A1* | 1/2004 | Merrill et al. ..................... 707/1 |
| 2004/0030907 A1* | 2/2004 | Dariel ........................... 713/189 |
| 2004/0176080 A1* | 9/2004 | Chakravorty et al. ...... 455/414.1 |
| 2004/0199786 A1* | 10/2004 | Walmsley et al. ............ 713/200 |
| 2004/0249757 A1* | 12/2004 | Walmsley et al. ............... 705/52 |
| 2005/0193098 A1* | 9/2005 | Khandpur et al. ............ 709/220 |
| 2006/0100010 A1* | 5/2006 | Gatto et al. ...................... 463/29 |
| 2006/0225071 A1* | 10/2006 | Kim .............................. 717/174 |
| 2008/0148060 A1* | 6/2008 | Thorell .......................... 713/187 |
| 2009/0300738 A1* | 12/2009 | Dewe et al. ........................ 726/6 |
| 2010/0263051 A1* | 10/2010 | Ngalle ............................ 726/26 |
| 2011/0016320 A1* | 1/2011 | Bergsten et al. .............. 713/170 |

\* cited by examiner

METHOD FOR SECURE DOWNLOADING OF APPLICATIONS

TECHNICAL FIELD

The invention is concerned with secure downloading of applications from a server.

BACKGROUND ART

The Global System for Mobile Communication (GSM) is a standard for digital wireless communications. GSM has much more services than just voice telephony. Today's second-generation GSM networks deliver high quality and secure mobile voice and data services (such as SMS/Text Messaging) with full roaming capabilities across the world.

The development of GSM Networks and terminals to support more advanced data bearer technologies has allowed for the introduction of new exciting data services and mobile applications.

In mobile networks people can be contacted by calling to their mobile telephone number or by sending to that number a so called short message by e.g. making use of the Short Message Service (SMS). The point-to-point Short message service (SMS) provides a means of sending messages of limited size to and from GSM mobiles. Detailed information can be found in the ETSI standard GSM 03.40 Version 5.3.0.

The Subscriber Identity Module (SIM) inside GSM phones is a smart chip that was originally designed as a secure way to connect individual subscribers to the network. There is an on-going evolution of the SIM into a standardized and secure application platform for GSM and next generation networks. New functions added to the SIM card have enabled different applications and accelerated the move towards the mobile phone as a data terminal.

In order to execute various applications such as bank account monitoring, reservations for travel, theatre, weather forecasts services, etc. there is needed some kind of a program that uses different kind of interfaces and is running on the SIM card.

For a successful downloading of an application to a mobile phone, it is necessary that the mobile phone has support for the application by having the right program running on the SIM. The trend towards different standardized high level languages, such as Java Card, will continue, giving more and more flexibility and performance to the SIM card application developers. The adoption of a standard which defines APIs (Application Programming Interfaces) and application load mechanisms will allow the service provider to develop his application once and potentially load it over the air to any SIM card complying this standard.

As Java is emerging as an interoperable unified programming environment, it becomes possible to download interoperable applications, so called Java applets, on all SIM cards. The Java applets—such as games, banking applications, and other security applications—can e.g. work through a SIM/USIM API interface. Java also offers remote management procedures, using the GSM 03.48 and Global Platform communication standards.

The subscriber can by himself add or remove SIM Java applications or other applications either through the web or by using the mobile terminal. The Smart Card has been playing an important role in insuring security in networks and thus, the inherent security properties of the SIM can be used to enable end-to-end security, encryption, authentication and signing.

The SIM card will keep offering its intrinsic security to validate new services access and to secure transactions. The future generation of "Internet-like" phones will make the best use of the SIM card through the execution of authentication applications for service access and transaction acceptation, but also through its capability to store configuration and user data.

The toolkit programs—which are stored on the SIM card are the means by which operators are able to customize their service portfolios.

Different mechanisms allow the service provider to load applications over the air to a SIM card.

Wireless Application Protocol (WAP) is a protocol that has successfully established a de facto standard for the way in which wireless technology is used for Internet access. WAP technology has been optimized for information delivery to mobile phones. GSM phones can thus access the internet through WAP. WAP downloading of applications to a mobile phone takes place so that the user first browses the site with the mobile phone and selects the midlet/application he wants to download. The user then writes an URL (Uniform Resource Location) address to a WAP site containing the desired midlets/applications. The selected application is then directly downloaded and installation takes place on the mobile phone.

Another known WAP downloading method is the WAP push initiated download, in which the user browses a website with a normal internet web browser. This site contains applications, form which the user selects one for downloading and supplies his mobile phone number to the site. The site then connects to a WAP Push gateway and sends a WAP Push to the user. The push contains an URL to the application and the browser is launched to open this URL. The application is then downloaded and installation takes place in the mobile phone.

There are some problems connected to the known downloading solutions with respect to the security, which arise when subscribers can not be sure if they can trust the content provider and the service to be download. The subscribers have to be sure about that the service to be downloaded is secure and without e.g. viruses etc. The increasing number of content providers makes this problem even worse.

The object of the application is to provide improved downloading methods to mobile terminals.

Especially, the object is to develop a secure method for downloading applications to mobile phones.

SUMMARY OF THE INVENTION

The method of the invention for downloading applications takes place in a network comprising at least a server, a mobile terminal, a trusted operator and, preferably, a terminal, such as a Personal Computer (PC). In the method, a user selects an application to be downloaded at his computer or mobile terminal. He then sends a request from the server for downloading the selected application to the mobile terminal. The server sends a message to the mobile terminal with instructions for downloading of the application. This message is sent via a trusted operator in order to ensure a secure downloading. Thereafter said application is downloaded to the mobile terminal.

Preferable embodiments of the invention are presented in the subclaims.

By means of the method of the invention, the user can be sure that he can trust the content provider and the service to be downloaded. It is important that the service to be downloaded is secure and without e.g. viruses etc. When the user has verified the origin and authenticity of the content to be downloaded, he can make an informed decision whether to allow the downloading.

The term trusted operator in this text meant an operator on which the user can rely. The role of the operator can be implemented in different ways. Certificates are used in the communication between the server and the operator, by means of which the operator can verify origin and authenticity of the content.

The verification can be performed by e.g. using known Public Key Infrastructures, PKI, involving solutions for encrypting messages, creating digital signatures and for verifying the signature of a sender of a message by means of certificates. A certificate to a sender's identity must be issued by a certification authority (CA), which is an organization that issues certificates in order to verify identities. More detailed information about the technology involved in public key infrastructure systems can be found e.g. in the book "Understanding Digital Signatures" by Gail L. Grant, ISBN 0-07-012554-6.

Optionally, certificates are also used in the communication between the operator and the mobile terminal. It might, however, be enough for the mobile terminal that the message is just sent via the operator, since when the user sees that the message came from a given predefined channel, which is agreed in advance between the user and the operator, and it is an indication to the user of a secure communication.

The operator can check the application to be downloaded with respect to viruses, correct working etc. before the message is forwarded to the user. The operator might also check that the mobile terminal has the right settings for the downloading. In that case he might offer the user said settings.

For selecting the application, from e.g. a website, the user might use a PC, a laptop, or a mobile terminal, such as a mobile phone.

Said message to the mobile terminal is a Short Message Service (SMS) to the SIM card on the mobile terminal and includes information for finding the requested application, such as the URL address. This information is the forwarded by the SIM card to a browser in the mobile terminal, the browser then performing the downloading.

As a result of the message to the mobile terminal, a voice and/or display signal is given to the user of the mobile terminal in order to indicate that the downloading is secure.

In the following, the invention will be described by means of some preferable embodiments referring to figures. The intention is not to restrict the invention to the details of these embodiments.

FIGURES

FIG. 1 is an environmental view of the network in which the method of the invention is performed.

Figure 2:
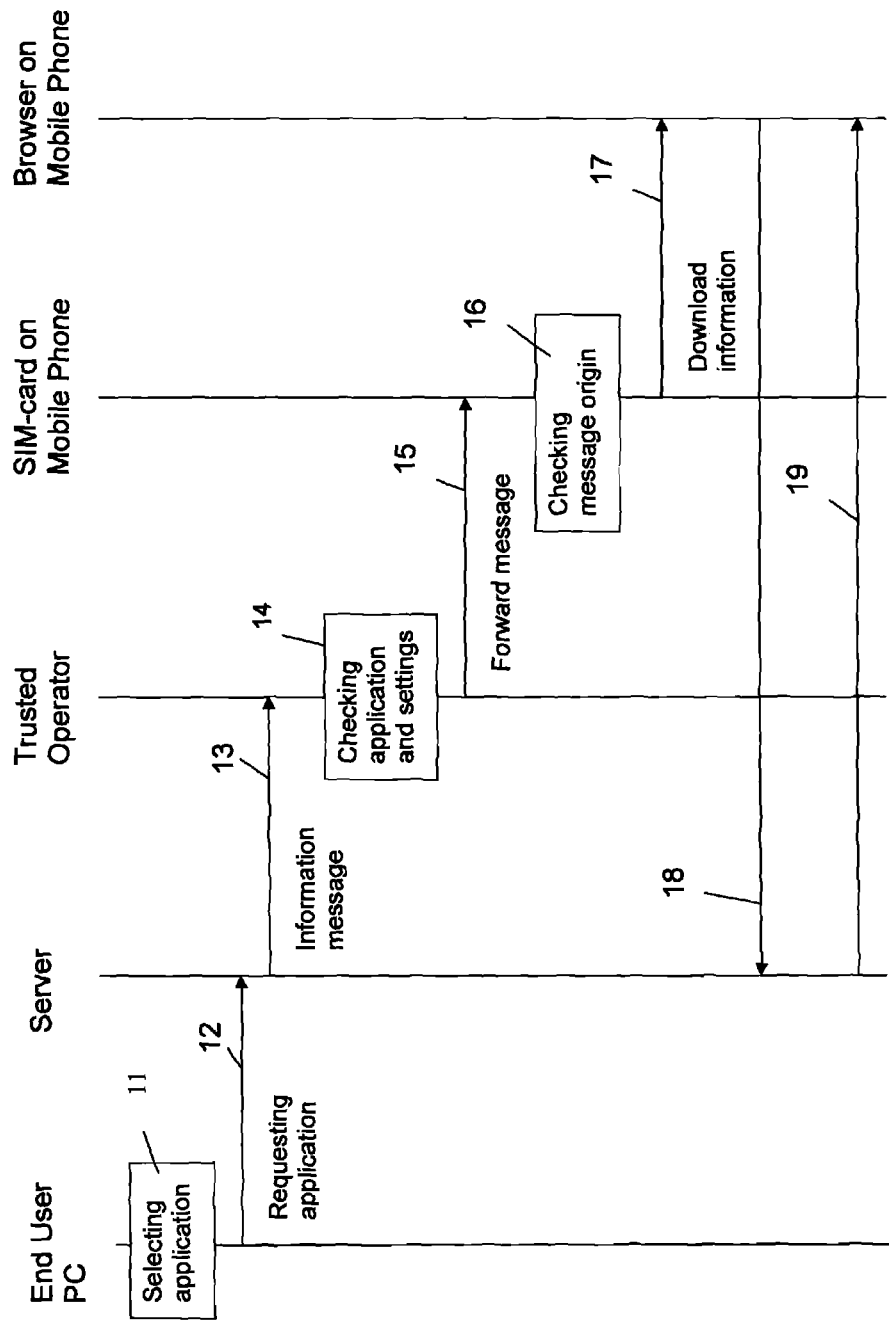

FIG. 2 presents an embodiment of the method of the invention

DETAILED DESCRIPTION

FIG. 1 is an environmental view of an example of a network in which the method of the invention is performed. The user uses a computer 1, which in FIG. 1 is a PC for selecting applications from internet 2. A server 3 offers applications through internet by means of web sites in the World Wide Web. The World Wide Web consists of the HTTP and HTTPS protocols, which allow users to jump from one web site on the Internet to another. HTTP, also known as the HyperText Transfer Protocol is the main protocol used to communicate between web servers and Internet browsers. HTTPS is the most popular network protocol for establishing secure connections for exchanging documents on the World-Wide Web. HTTPS are the initials for Hypertext Transfer Protocol Secure, a protocol supported by certain e-commerce servers that can support the required security software. Together, these documents constitute a large, inter-linked web of documents. Since the Internet spans the globe, these documents form a world-wide web.

The server 3 communicates with the users mobile terminal 6 via the user's operator 4 over a radio network of the mobile terminal, here GSM 5. The mobile terminal contains the SIM card 7 on which the services are downloaded and an internet web browser 8 for browsing web sites. The internet browser is needed for interpreting HTML into words and graphics when viewing a web page.

FIG. 2 presents an embodiment of the method of the invention, in which the end user in step 11 selects an application from a website to be downloaded to his mobile phone. The selection can either be made at the users PC (Personal Computer) as in FIG. 1 or from his mobile phone (not shown). If the selection is made from the mobile phone, the user can browse the web site he is interested in with his mobile phone, through e.g. the Wireless Application Protocol, WAP and select the application he wants to download if the user has a mobile phone with an internet connection.

For this purpose, the user can then write an URL (Uniform Resource Location) address to a site containing the desired application. Instead of writing an URL address the wanted site, the user might indicate the desired application by just clicking on a place on the site. The user might think that it is more comfortable to do this, i.e. browse and select the application, from his PC. In step 12, the user sends a request for the application from his PC (or his mobile phone) to the server having the application.

As a reply to the request in step 12, the server sends a message in step 13 confirming the user's order of the application and with instructions to the user how to proceed in order to get the application.

The message of step 13 first goes to an operator that the user can trust. There might be a contract in advance between the content provider having the application in said server and the operator about a channel through which application download confirmations can be sent via the operator. The user then knows that applications received through that channel and sent via the trusted operator are safe, i.e. they are really sent from the right content provider, there has not been any third party attack that has changed the application or introduced viruses therein etc.

The step 13 message might e.g. be sent through an HTTPS channel that uses the Secure Service layer, SSL, protocol. SSL is a protocol that encrypts a single session. In addition to encryption, authentication is used, which is the way that enables the operator to see that the message really was sent from the actual content provider. Authentication includes the use of certificates, with which it is ensured that the server is the right one.

The message in step 13 contains the URL address of step 12 and the telephone number to which the application is intended to be sent.

By means of the telephone number sent with the message in step 13, the operator can check that the mobile terminal to which the application shall be sent has the right settings for the application (i.e. right program environment) and other such possible things in a checking application and settings step 14. Furthermore, the operator might perform a virus check on the application. This can be done by an own virus program or by using virus results done by remote components.

In step 15, the message is forwarded to the SIM card on the mobile phone of the user. The message contains information about how to find the application, such as the URL address, and instructions how to proceed. This message is preferably also a message with certificate information, in which the server is authenticated by the trusted operator.

After checking, in step 16, that the message came from the trusted operator, for example by reading certificate information, it is forwarded in step 17 to the browser on the mobile phone in order to download the application.

In step 18, the browser sends a message to the server for downloading the application, which is sent to the browser in step 19.

The invention claimed is:

1. A method of downloading applications in a network comprising:
   providing a server, a mobile terminal and a trusted operator, the trusted operator entering a contract in advance with a content provider of the server about which predefined channel to use when sending a secured information message from the content provider to the trusted operator,
   a user selecting an application, located at an URL address of a website, to be downloaded from the server of the content provider,
   the user sending to the server a request for downloading the selected application to the mobile terminal,
   the content provider of the server sending the secured information message on the predefined channel to the trusted operator, the trusted operator receiving the secured information message from the content provider on the predefined channel,
   the trusted operator verifying origin and authenticity of the selected application,
   the trusted operator adding certificate information to the secured information message and creating an SMS message based on the secured information message and the certificate information,
   the trusted operator sending the SMS message to a SIM card on the mobile terminal with instructions for downloading the application and with information for finding the selected application from the URL address of the website,
   the mobile terminal checking the certificate information of the SMS message to ensure the SMS message was being sent by the trusted operator,
   the mobile terminal using the instructions of the SMS message to start downloading the selected application from the server to the mobile terminal,
   the SIM card forwarding the information sent from the trusted operator to a browser in the mobile terminal, and
   the browser in the mobile terminal downloading the selected application to the mobile terminal.

2. The method of claim 1 wherein the trusted operator checks the application to be downloaded.

3. The method of claim 1 wherein the method further comprises the trusted operator checking that the mobile terminal has right settings for the downloading.

4. The method of claim 1 wherein the method further comprises providing a Personal Computer (PC) at which the user performs the selection from a website.

5. The method of claim 1 wherein the selection is performed by the user from a website at the mobile terminal of the user.

6. The method of claim 1 wherein the instructions for downloading includes information for finding the selected application.

7. The method of claim 1 wherein the mobile terminal checks message origin.

8. The method of claim 7 wherein the message origin is checked from the message by means of certificate data.

9. The method of claim 7 wherein information is forwarded by a SIM card to a browser in the mobile terminal.

10. The method of claim 7 wherein the downloading of the application to the mobile terminal is performed by a browser.

11. The method of claim 1 wherein as a result of the message to the mobile terminal, a voice and/or display signal is given to the user of the mobile terminal in order to indicate that the downloading is secure.

* * * * *